United States Patent
Mifune

(10) Patent No.: US 7,532,343 B2
(45) Date of Patent: May 12, 2009

(54) IMAGE FORMING APPARATUS AND DOCUMENT ADMINISTRATION SYSTEM

(75) Inventor: Eiji Mifune, Osaka (JP)

(73) Assignee: Kyocera Mita Corporation (JP)

( * ) Notice: Subject to any disclaimer, the term of this patent is extended or adjusted under 35 U.S.C. 154(b) by 911 days.

(21) Appl. No.: 10/745,321

(22) Filed: Dec. 22, 2003

(65) Prior Publication Data

US 2005/0134898 A1    Jun. 23, 2005

(51) Int. Cl.
*G06F 3/12* (2006.01)
*G06F 13/00* (2006.01)

(52) U.S. Cl. ............... 358/1.15; 358/1.16; 358/403

(58) Field of Classification Search ............ 358/1.16, 358/403, 1.15, 1.1, 1.13, 1.12, 1.18, 1.17; 400/61, 161; 709/218, 224, 217; 395/114; 707/101, 200; 715/517; 710/62; 345/752
See application file for complete search history.

(56) References Cited

U.S. PATENT DOCUMENTS

| | | | | |
|---|---|---|---|---|
| 5,699,494 A * | 12/1997 | Colbert et al. | ............. | 358/1.15 |
| 5,752,075 A * | 5/1998 | Kikinis | ............ | 710/1 |
| 5,878,430 A * | 3/1999 | Lafuse | .......... | 707/103 R |
| 6,098,067 A * | 8/2000 | Erickson | ......... | 707/10 |
| 6,115,739 A | 9/2000 | Ogawa et al. | | |
| 6,173,295 B1 * | 1/2001 | Goertz et al. | ............. | 715/209 |
| 6,184,996 B1 * | 2/2001 | Gase | ............. | 358/1.15 |
| 6,498,611 B1 * | 12/2002 | Beard et al. | ............. | 715/752 |
| 6,738,841 B1 * | 5/2004 | Wolff | ............. | 710/62 |
| 6,778,289 B1 * | 8/2004 | Iwata | ............. | 358/1.15 |
| 2002/0069212 A1 * | 6/2002 | Leonardos | ............. | 707/200 |
| 2003/0131072 A1 * | 7/2003 | Kobayashi | ............. | 709/218 |
| 2003/0161670 A1 * | 8/2003 | Watanabe et al. | ............. | 400/61 |
| 2003/0197882 A1 * | 10/2003 | Tsukuba et al. | ............. | 358/1.12 |
| 2003/0204591 A1 * | 10/2003 | Ueda et al. | ............. | 709/224 |
| 2004/0145755 A1 * | 7/2004 | Ishiguro | ............. | 358/1.1 |
| 2005/0068563 A1 * | 3/2005 | Nguyen et al. | ............. | 358/1.15 |

FOREIGN PATENT DOCUMENTS

| | | |
|---|---|---|
| JP | 9-37013 | 2/1997 |
| JP | 2002-77500 | 3/2002 |

* cited by examiner

*Primary Examiner*—King Y Poon
*Assistant Examiner*—Allen H Nguyen
(74) *Attorney, Agent, or Firm*—Gerald E. Hespos; Anthony J. Casella

(57) ABSTRACT

An image forming apparatus is connected via a network with at least one computer having a storage section capable of creating at least one folder. The apparatus has a data acquiring section to acquire document data and a location information acquiring section to acquire location information from each computer through the network. An administering section registers the at least one folder identified by the location information as at least one folder capable of storing the document data. A display unit displays an image and a folder display controlling section controls the display unit to display an image of registered folders. An input operation unit accepts input operation by a user and a folder designation accepting section allows the user to designate a desired folder on the display unit for acceptance with use of the input operation unit. A data transmitting section transmits the document data to the designated folder.

10 Claims, 9 Drawing Sheets

IMAGE FORMING APPARATUS AND DOCUMENT ADMINISTRATION SYSTEM

BACKGROUND OF THE INVENTION

1. Field of the Invention

The present invention relates to an image forming apparatus and a document administration system.

2. Description of the Related Art

In the present specification, a "document" includes a writing, a drawing, a picture and the like, and "document data" means the data of a document. Document data, therefore, includes printable data in general. Document data may have various forms, such as bit data and character codes. Further, "document administration" means administration of document data.

Among various types of image forming apparatuses, in particular, those having functions of a copier, a facsimile machine, a printer, a scanner, and the like, which are known as digital complex machines, there has been known such a type having a function of document administration by storing document data obtained, for example, by reading a document image with a scanner into an internal storage device of the digital complex machine itself or a storage section of a computer communicatively connected with the machine via a network. In storing document data obtained by reading a document image with the scanner of the digital complex machine, it is required to designate a storage site of the document data where the data is to be stored between the internal storage device of the digital complex machine and the storage section of the computer communicatively connected with the machine via the network. The storage sites of respective data are registered in advance in an operating section of the digital complex machine, and thereby, a user is allowed to designate a desired storage site among the pre-registered storage sites.

In case of printing out document data by reading out the data from the digital complex machine, desired document data is read out from the storage device of the digital complex machine, and printed out. In case of printing out document data with use of a computer communicatively connected with the digital complex machine via a network, desired data stored in the storage section of the computer is sent to the digital complex machine and printed out by the digital complex machine.

In case of storing document data obtained by reading a document image with the scanner of the digital complex machine in a relevant folder in the storage section of the computer communicatively connected with the digital complex machine via the network, a user is allowed to store the data in an existing folder with use of a document administration software or an equivalent software for administering document data installed in the computer. However, the user is required to implement two operations, i.e., set and register a folder in the operating section of the digital complex machine, and create a folder in the computer communicatively connected with the digital complex machine via the network. Namely, the user is required to implement substantially the same operation twice, i.e., one time with respect to the digital complex machine, and the other time with respect to the computer.

In case of reading out document data for printing out by the conventional digital complex machine, a user cannot read out the data stored in the storage section of the computer for printing out merely by manipulation on the digital complex machine.

The conventional digital complex machine has suffered from the drawbacks such as cumbersome operations of setting and registering storage sites of data, and limitation on printable document data. There is a demand for a digital complex machine having improved usability in document administration.

SUMMARY OF THE INVENTION

In view of the above, it is an object of the present invention to provide an image forming apparatus and a document administration system that have overcome the problems residing in the prior art. It is another object of the present invention to provide an image forming apparatus and a document administration system having improved usability in document administration.

According to an aspect of the present invention, an image forming apparatus is adapted to be connected via a network with at least one computer having a storage section capable of creating at least one folder, and the apparatus comprises: a data acquiring section to acquire document data; a location information acquiring section to acquire a location information from each of the at least one computer through the network, the location information relating to a location of the at least one folder created in the storage section of each of the at least one computer; an administering section to register the at least one folder identified by the location information as at least one folder capable of storing the document data; a display unit to display an image; a folder display controlling section to control the display unit to display an image of registered one or more folders; an input operation unit to accept an input operation by a user; a folder designation accepting section to allow the user to designate a desired folder among the one or more folders displayed on the display unit for acceptance with use of the input operation unit; and a data transmitting section to transmit the document data to the designated folder.

In such an arrangement, the folder location information is acquired from the computer communicatively connected with the image forming apparatus via the network by the location information acquiring section, and is registered as a folder capable of storing document data by the administering section. Registered one or more folders are displayed on the display unit by control of the folder display control section. The folder designation accepting section accepts a user's designation of a desired folder among the displayed one or more folders. When the folder designation accepting section accepts the desired folder in the storage section of the computer, the document data is transmitted to the folder by the data transmitting section. With such an arrangement, the user is allowed to send the document data to the storage section of the computer by the data transmitting section for storage. Such an arrangement eliminates a user's operation of registering the folder in the storage section of the computer as a storage site for the document data, which improves usability in document administration of the image forming apparatus.

These and other objects, features and advantages of the present invention will become more apparent upon reading of the following detailed description along with the accompanying drawings.

DETAILED DESCRIPTION OF THE PREFERRED EMBODIMENTS

Figure 1:
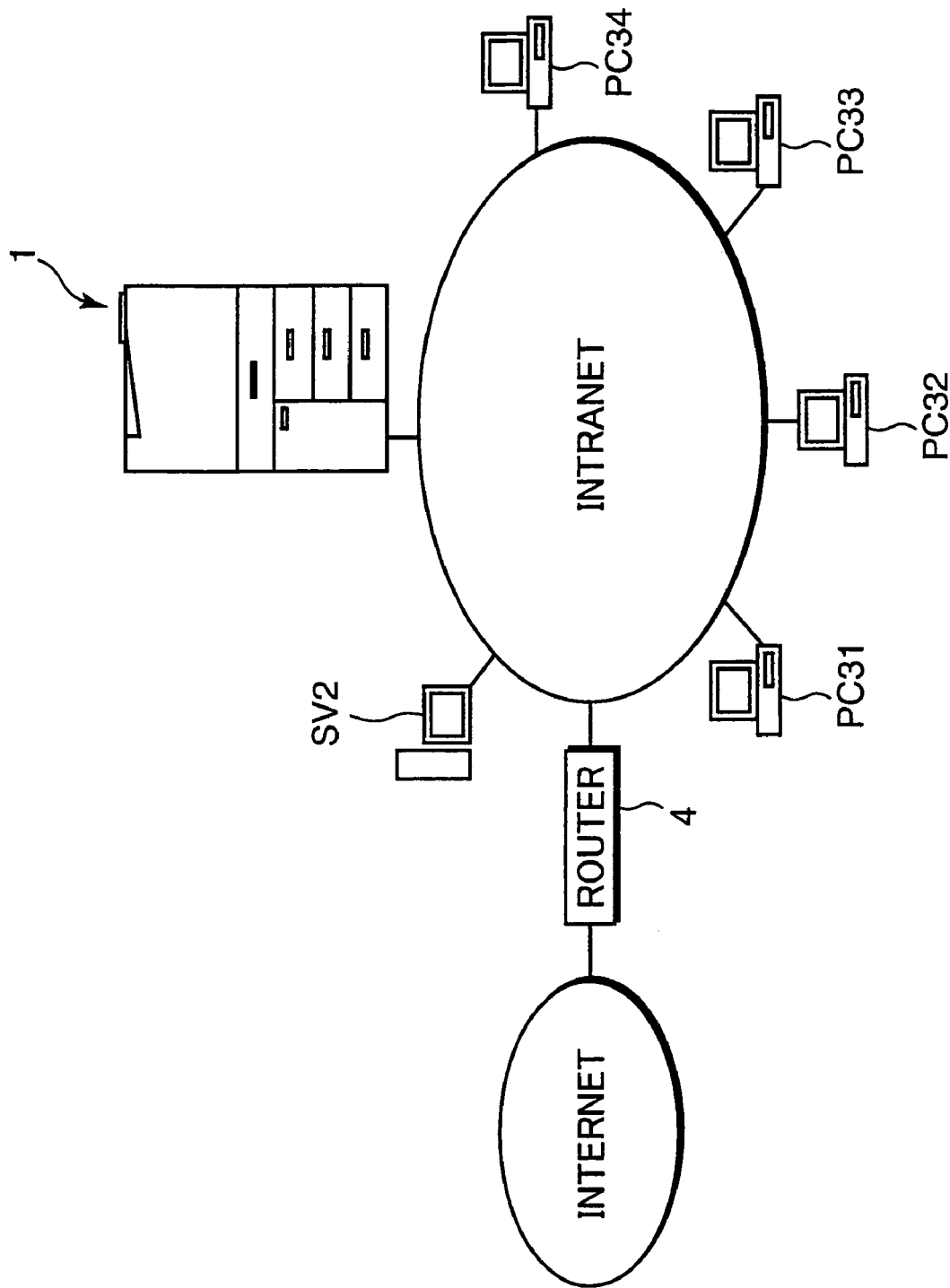
FIG. 1 is an illustration showing a network configuration established by an image forming apparatus according to an embodiment of the present invention, and computers communicatively connected with the image forming apparatus via a network.

In the following, a preferred embodiment of the present invention is described with reference to the accompanying drawings. FIG. 1 is an illustration showing a document administration system having an image forming apparatus according to the embodiment of the present invention, and computers communicatively connected with the image forming apparatus via a network.

A digital complex machine 1, as an example of the inventive image forming apparatus, has functions of a copier, a facsimile machine, a printer, a scanner, and the like. Further, the digital complex machine 1 has a function of administering documents, i.e., a function of administering document data by storing document data obtained by reading a document image or the like with the scanner of the digital complex machine 1 into an internal storage device of the digital complex machine 1 or a storage section of each of a server computer (SV) 2 and personal computers (PCs) 31 through 34, which are terminal devices, and by reading out the data stored therein for printing out. The server computer 2, and the personal computers 31 through 34 are communicatively connected with the digital complex machine 1 by the intranet or the like. Hereinafter, the server computer 2, and the personal computers 31 through 34 which are operatively and communicatively connected with the digital complex machine 1 via the network are referred to as "operative computers" as a whole throughout the present specification.

A user is allowed to set and register a document data storage site by selecting a storage site from the internal storage device of the digital complex machine 1, and the storage section of each of the operative computers. The user is allowed to designate the document data storage site utilized in storing document data read by a scanning section of the digital complex machine 1 and in reading out the stored document data to be printed out with use of an operation panel section, which will be described later.

The network comprised of the digital complex machine 1 and the operative computers are communicatively connected with the Internet via a router 4.

Figure 2:
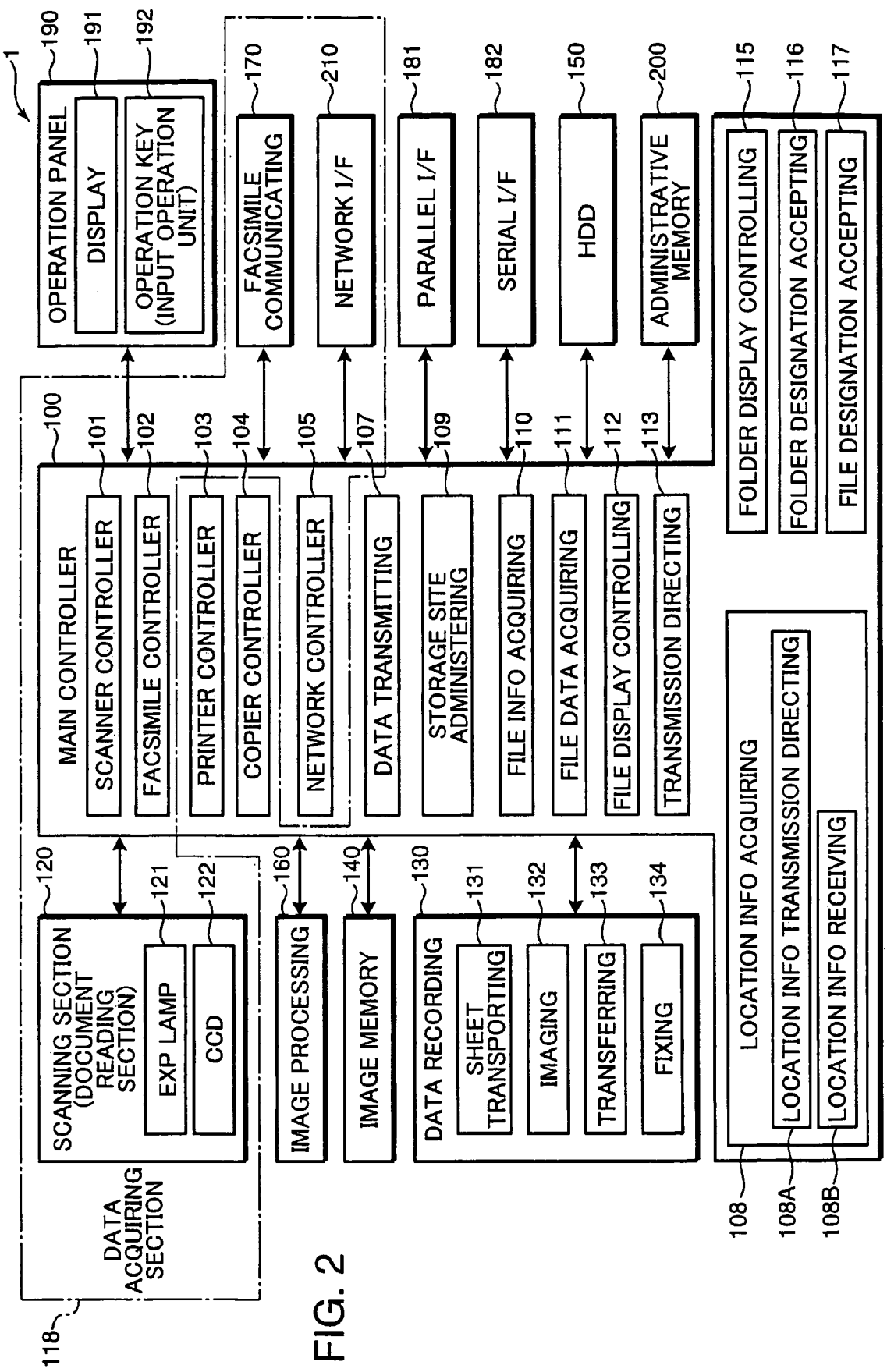
FIG. 2 is a functional block diagram showing a schematic arrangement of the image forming apparatus according to the embodiment of the present invention

FIG. 2 is a functional block diagram showing a schematic arrangement of the digital complex machine 1. The digital complex machine 1 has a main controller 100 for controlling an overall operation of the digital complex machine 1.

The main controller 100 is electrically connected with the scanning section (document reading section) 120 which includes an exposure lamp 121 and a CCD 122 and which is adapted for reading out a document image, and a data recording section 130 including a sheet transporting unit 131, an imaging unit 132, a transferring unit 133, and a fixing unit 134. The main controller 100 is also electrically connected with an image memory 140 in which document data read by the scanning section 120 is temporarily stored, and a hard disc drive (HDD, a storage device) 150 having a large capacity capable of storing a large amount of document data.

In reading a document image by the scanning section 120, an image processing section 160 converts an analog image signal outputted from the scanning section 120 into a digital image signal, and converts the digital image data into compressed image data after implementing an image processing for improvement of image quality. The compressed image data is written in the image memory 140. The main controller 100 stores the compressed data written in the image memory 140 into the HDD 150 as document data contained by a file for document administration. In printing out the stored document data, the document data (compressed data) is read out from the HDD 150 or from each operative computer to be written into the image memory 140. The image processing section 160 expands the compressed data, and implements an image processing depending on the output state of an exposing device such as an LED or a laser emitter. For instance, in the case where image exposure is implemented with use of a laser emitter, the image processing section 160 modulates a laser signal (the signal for controlling a laser beam emitted from the laser emitter) with an analog signal. The document data is printed out by the data recording section 130 (imaging unit 132) based on the signal modulated with the analog signal.

The main controller 100 further comprises a scanner controller 101, a facsimile controller 102, a printer controller 103, a copier controller 104, and a network controller 105 for controlling respective functions executed by the digital complex machine 1.

The scanner controller 101 controls relevant elements necessary for executing scanning operation of the digital complex machine 1. The facsimile controller 102 controls relevant elements necessary for executing the facsimile function of the digital complex machine 1. Specifically, the facsimile controller 102 controls a facsimile communicating section 170 for handling data necessary for communications via facsimile. The facsimile communicating section 170 has a network control unit (NCU) which controls communicative connection with a counterpart facsimile machine, which is a data recipient and sender. The copier controller 104 controls relevant elements necessary for executing the copying function of the digital complex machine 1.

The printer controller 103 controls relevant elements necessary for executing the printing function of the digital complex machine 1. The printer controller 103 is electrically connected with a parallel interface (I/F) 181 and a serial interface (I/F) 182. The parallel I/F 181 is connected with an external device according to parallel transmission in which data is transmitted in the unit of bits with use of signal lines. The serial I/F 182 is connected with an external device according to serial transmission in which data is transmitted bit by bit with use of a single signal line.

The network controller 105 controls data communications between the digital complex machine 1 and the operative computers, and further with the websites available on the Internet. The network controller 105 is operative to communicate data with an external device via a network interface (I/F) 210.

A data acquiring section 118 acquires document data from a document or via facsimile line, network or the like. The data acquiring section 118 includes the scanning section 120, the scanner controller 101, the facsimile controller 102, the network controller 105, the facsimile communicating section 170 and the network I/F 210.

The main controller 100 further comprises a data transmitting section 107 for transmitting document data acquired by the data acquiring section 118, e.g., read by the scanning section 120 to a document data storage site accepted by an operation panel section 190, a location information acquiring section 108 for acquiring, from the operative computers, information relating to the location of a folder set in the storage section of each of the operative computers (referred to as folder location information), and an administering section 109 for registering and administering the folder identified by the folder location information acquired by the location information acquiring section 108, as the folder capable of storing the document data such as one read by the scanning section 120.

The main controller 100 further comprises a file information acquiring section 110 for acquiring, from the operative computers, information relating to each document data (referred to as file information) stored in the folder accepted by the operation panel section 190.

The main controller 100 further comprises a file display controlling section 112 for displaying, on a display unit 191, storage sites capable of storing document data based on the folder location information acquired by the location information acquiring section 108. The main controller 100 further comprises a folder display controlling section 115 for displaying, on the display unit 191, a storage status of the document data in the folder accepted by the operation panel section 190 based on the file information acquired by the file information acquiring section 110.

The main controller 100 further comprises a file data acquiring section 111 for acquiring document data that forms contents of or is contained by a file accepted by the operation panel section 190 from the folder storing the document data. The imaging unit 132 prints the document data acquired by the file data acquiring section 111.

The location information acquiring section 108 comprises a location information transmission directing section 108A for directing the operative computers to transmit the location information on the folder set in the storage section of each of the operative computers. The location information acquiring section 108 further comprises a location information receiving section 108B for receiving the location information transmitted by the relevant operative computer in response to the direction sent by the location information directing section 108A.

The main controller 100 further comprises a transmission directing section 113 for sending a command requesting transmission of relevant file data to the relevant operative computer(s). The main controller 100 further comprises a folder designation accepting section 116 that accepts the designation of one of registered folders indicated on the display unit 191 by the folder display controlling section 115 as a storing site of the document data. The designation is given by the user with use of an operation key unit (input operation unit) 192. The data transmitting section 107 transmits the document data to the folder to which the designation accepted by the folder designation accepting section 116 is directed.

The main controller 100 further comprises a file designation accepting section 117 that accepts the designation of desired one of files indicated on the display unit 191 by the file display controlling section 112. The designation is given by the user with use of the operation key unit 192. The file data acquiring section 111 acquires document data contained by the desired file to which the accepted designation is directed.

The respective controllers 101, 102, 103, 104, 105, 112, and 115 and the respective relevant elements are comprised of individual processing circuits, for instance. Alternatively, the main controller 100 may comprise such a computer that the processing each executed by the scanner controller 101, the facsimile controller 102, the printer controller 103, the copier controller 104, the network controller 105, the data sending section 107, the location information acquiring section 108, the administering section 109, the file information acquiring section 110, the file display controlling section 112, the file data acquiring section 111, the transmission directing section 113, the folder display controlling section 115, the folder designation accepting section 116, and the file designation accepting section 117 is executed by activating a central processing unit (CPU) or an equivalent element with use of a document administration program stored in the HDD 150. The program can be supplied either via a recording medium such as a Read Only Memory (ROM) and CD-ROM, or via a transmitting medium such as a network.

The operation panel section 190 is used for a user (operator) to enter various commands necessary for operating the digital complex machine 1. The operation panel section 190 has a liquid crystal display (LCD), and also is provided with the display unit 191 on which various operation messages necessary for operating the digital complex machine 1 and various information relating to registered document data (namely, document data that has been acquired by the data acquiring section 118, e.g., read by the scanning section 120 and registered) are displayed, and the operation key unit 192, which is comprised of ten keys and with which a user is allowed to direct printout execution and designate the number of copies of document data to be printed out.

Preferably, the display unit 191 has a touch panel function, so that a user is allowed to enter a necessary command by touching on a touch panel. In case of registering document data read by the scanning section 120 into the digital complex machine 1 or printing out the registered document data after read out, a user is allowed to designate desired document data storage site through the operation panel section 190.

The operation panel section 190 accepts an operation command from the user in designating a storage site of document data read by the scanning section 120 between the HDD 150 and the operative computers, accepts an operation command from the user in selecting the folder in the storage section of each of the operative computers, and accepts an operation command from the user in designating document data stored in the folder in the storage section of each of the operative computers.

When a user designates a document data registration mode on the operation panel section 190, document data read by the scanning section 120 is stored in the HDD 150 for registration in case that the document data is to be stored in the digital complex machine 1. In case that the document data is to be stored into the storage section of the operative computer, the network controller 105 is operated to transfer the document data to a final storage site via the network I/F 210.

In retrieving the stored document data, the user is allowed to designate a document data retrieval mode on the operation panel section 190. Upon designation of the document data retrieval mode, items necessary for searching for a file containing a desired document data (including text data and image data) stored in the HDD 150 or the storage section of each of the operative computers are displayed on the display unit 191. Thereafter, when the user designates a certain folder which is supposed to store the desired document data in search, the name of each file in the designated folder, an index image (thumbnail image) corresponding to document data contained by each file, etc. are displayed on the display unit 191. Then, when the user designates a desired file name on the display unit 191, the document data contained by the designated file is read out and printed out by the data recording section 130.

The digital complex machine 1 further comprises an administrative memory 200 for storing information relating to administration of the registered document data stored in the HDD 150, codes identifying the respective document data, and other necessary information. In the embodiment, the administrative memory 200 stores folder location information and file information acquired from the operative computers.

Figure 3:
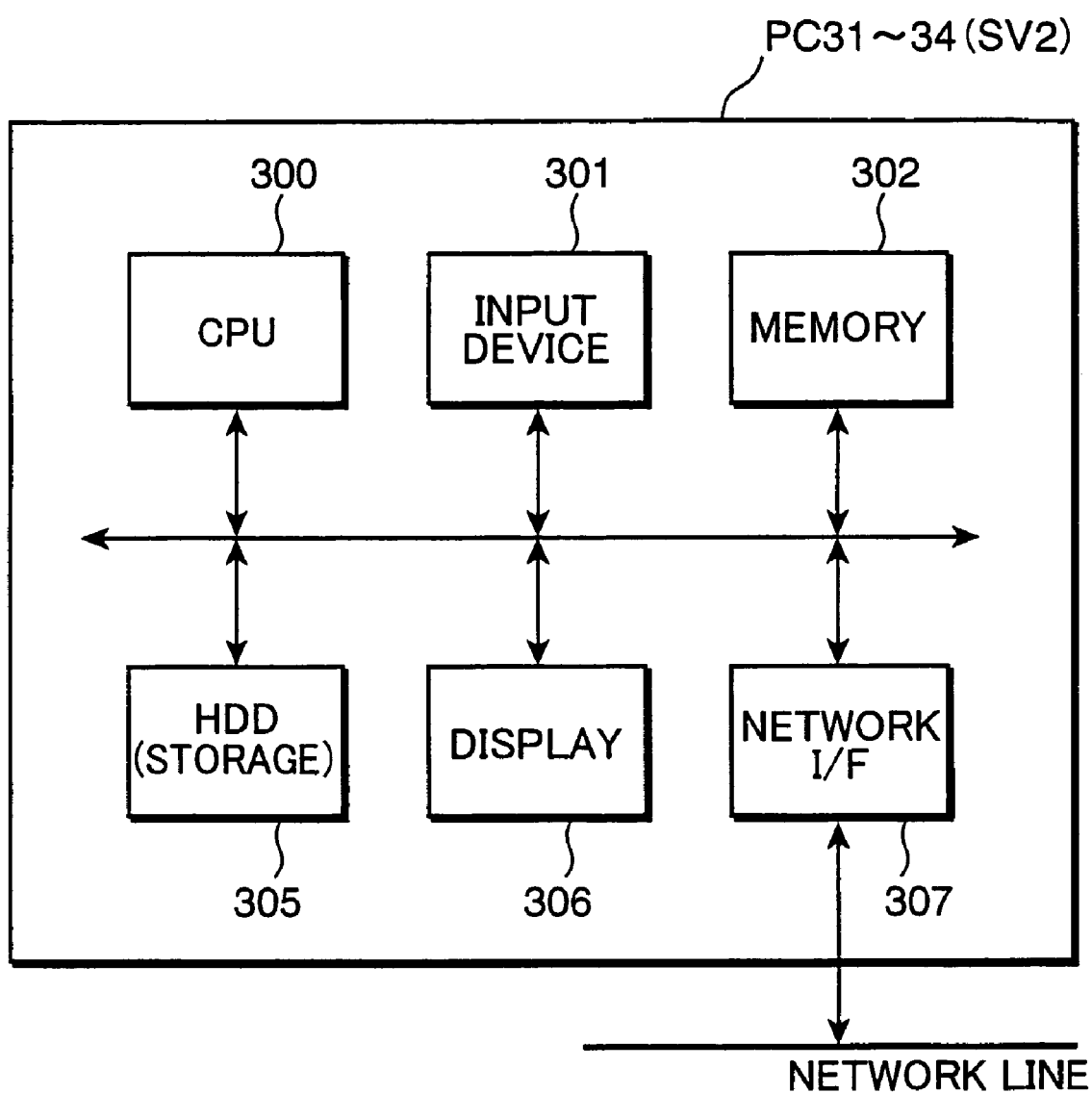
FIG. 3 is a block diagram showing a schematic arrangement of the computers communicatively connected with the image forming apparatus via the network.

FIG. 3 is a block diagram showing a schematic arrangement of one of the operative computers communicatively connected with the digital complex machine 1 via the network. Each operative computer has a CPU 300 which is activated by a system program for controlling an overall operation thereof The CPU 300 is electrically connected with an input device 301, a memory 302, a hard disc drive (HDD, storage section) 305, a display 306, and a network I/F 307 via an internal bus. Various data are inputted and outputted between the relevant elements under the control of the CPU 300 via the internal bus to execute various processing.

The input device 301 is comprised of a keyboard and a mouse with which a user is allowed to enter various designation commands. The HDD 305 stores a document administration program, for instance. The CPU 300 reads out the document administration program from the HDD 305, executes computation necessary for document administration, and controls various operations of the operative computer. The memory 302 is allocated as a work area for the CPU 300. The document administration program is operable to transmit, at least to the digital complex machine 1 via the network, information relating to the location of the folder set in the HDD 305. The folder location information includes: information for identifying the relevant operative computer among the plurality of operative computers; information for specify the storage area in the operative computer where the folder is stored; and information for identifying the folder on the network such as a folder name (information represented by "¥¥Pc098¥G¥yamada" for instance), an internet protocol (IP) address, and an uniform resource locator (URL). Also, document data sent from the digital complex machine 1 is storable in the HDD 305.

The display 306 includes a cathode ray tube (CRT) or a liquid crystal display (LCD). Various screen images are displayable on the display 306 under the control of the CPU 300. The document administration program is recorded in the HDD 305 from a storage medium such as a CD-ROM by a storage medium reader such as a disc drive. The document administration program can also be supplied through a transmitting medium, such as a network.

The CPU 300 also functions as a network controller for controlling communications of various data including document data contained by a file and file information such as the file name attached to the file between the digital complex machine 1 and the operative computers. Various data to be communicated with an external device are transmitted thereto by the network I/F 307.

Next, a processing as to how a document data storage site is set in the digital complex machine 1 is described. A document data storage site is set and registered in the administering section 109 of the digital complex machine 1, for instance.

Figure 4:
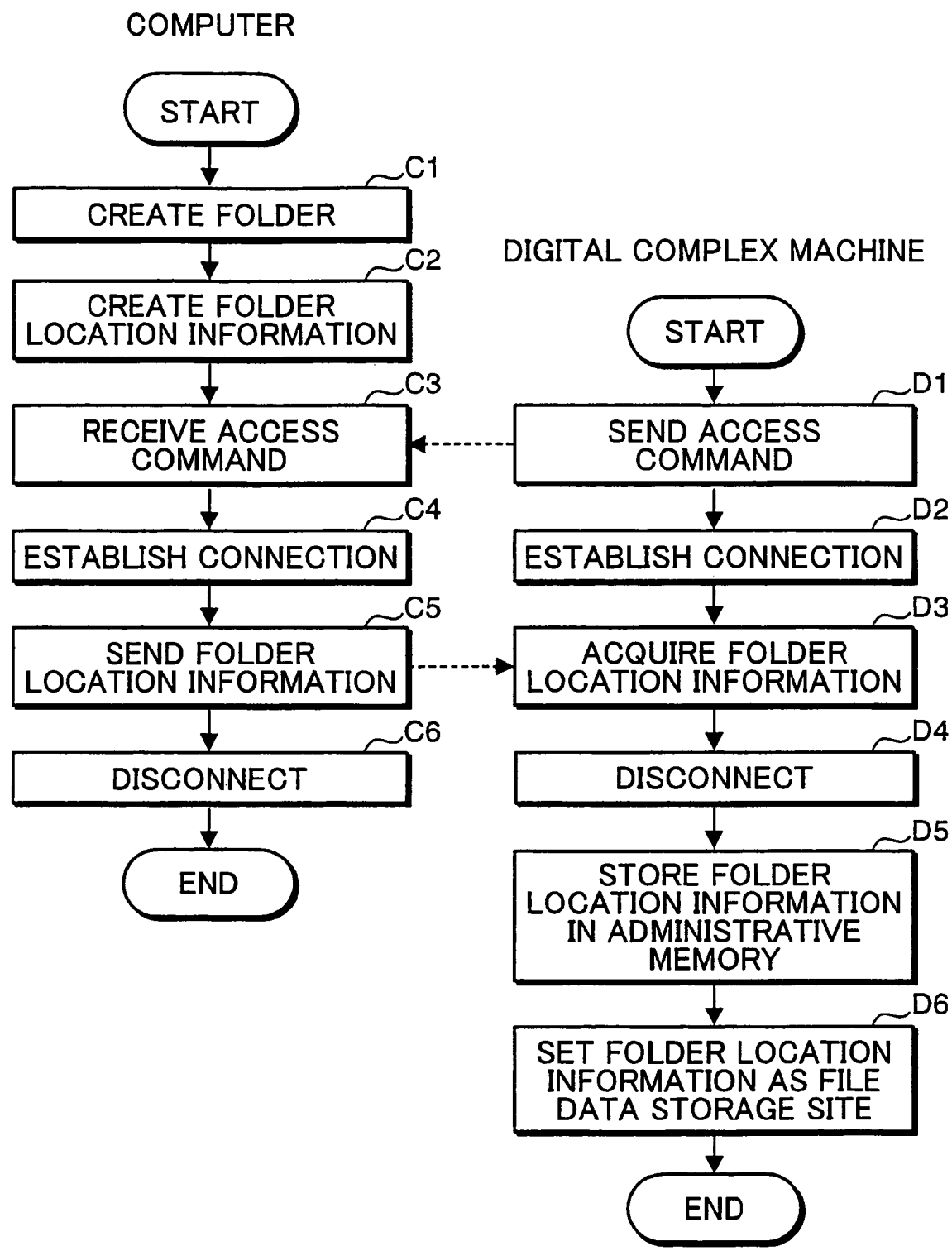
FIG. 4 is a flowchart showing a processing of setting a document data storage site in the image forming apparatus.
Figure 5:
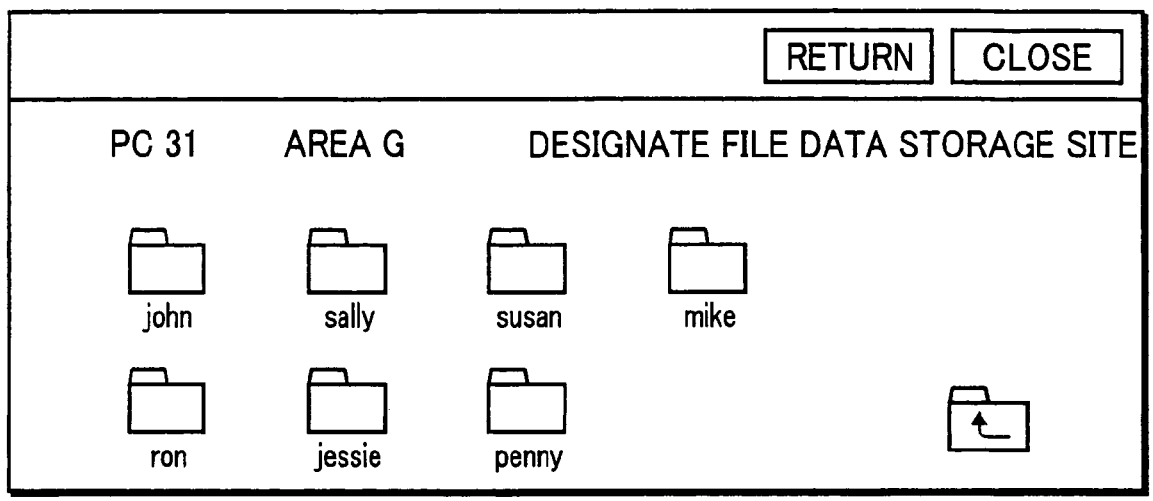
FIG. 5 is an illustration of an exemplified display screen showing a list of document data storage sites.

It is possible for a user to set and register a folder, which is a document data storage site to be set and registered in the administering section 109, by setting and registering a folder (folder location information) located in the storage section of the operative computer into the administering section 109 through the operation panel section 190. However, with use of the inventive digital complex machine 1, the user is allowed to acquire the folder location information from the operative computer. FIG. 4 is a flowchart showing the processing between the digital complex machine 1 and an operative computer communicatively connected with the digital complex machine 1 via the network. FIG. 5 is an illustration of an exemplified display screen showing a list of document data storage sites displayed on the display unit 191.

In the following, steps to be implemented by the operative computer are denoted at Steps C1, . . . , whereas steps to be implemented by the digital complex machine 1 are denoted at Steps D1, . . .

When a folder is created in the operative computer (Step C1), folder location information is created based on various folder-related information such as the folder name attached to the created folder, and ID information identifying the operative computer to which the created folder belongs (Step C2). The folder location information is generated in a data format such as CSV format or attribute format in view of versatility and feasibility in data communications between different kinds of softwares, and between different kinds of electronic devices. With such an arrangement, the digital complex machine 1 can easily handle the folder location information acquired by the location information acquiring section 108 from the operative computer.

Upon receiving an access command requesting transmission of the folder location information from the digital complex machine 1 (Step C3), communicative connection with the digital complex machine 1 is established (Step C4). Upon establishment of the connection with the digital complex machine 1, the operative computer sends, to the digital complex machine 1, the folder location information with use of the network I/F 307 (Step C5). After the transmission of the folder location information, the operative computer is disconnected from the digital complex machine 1 (Step C6).

Referring to the processing by the digital complex machine 1, the digital complex machine 1 sends, to the operative computer, an access command requesting transmission of the folder location information to the operative computer with use of the location information transmission directing section 108A via the network I/F 210 and the network controller 105 (Step D1). In response to the issuance of the access command, the network controller 105 establishes communicative connection with the operative computer (Step D2). When the location information receiving section 108B acquires the folder location information from the operative computer (Step D3), then, the network controller 105 disconnects the communication from the operative computer (Step D4). The folder location information acquired by the location information receiving section 108B is stored in the administrative memory 200 (Step D5), and is set and registered in the administering section 109 as a document data storage site (Step D6). In other words, a folder identified by the folder location information is set and registered as a folder capable of storing a document data. The folder location information is acquired in a data format having high data interchangeability such as CSV format. Accordingly, the digital complex machine 1 can handle such information as information relating to a document data storage site to be registered in the administering section 109.

After being acquired from the operative computer and registered as the document data storage site information in the administering section 109, the folder location information is read out from the administrative memory 200 with use of the folder display controlling section 115, and displayed on the display unit 191 of the operation panel section 190 as a list of document data storage sites, as shown in FIG. 5, for instance.

As mentioned above, in the inventive digital complex machine 1, the folder location information generated in the operative computer is transmitted to the digital complex machine 1 and displayed on the operation panel section 190 of the digital complex machine 1 for manipulation by the user. Such an arrangement eliminates an additional operation by the user of setting and registering a folder in the digital complex machine 1 as a document data storage site, thereby improving usability in administering document data in the digital complex machine 1.

Figure 6:
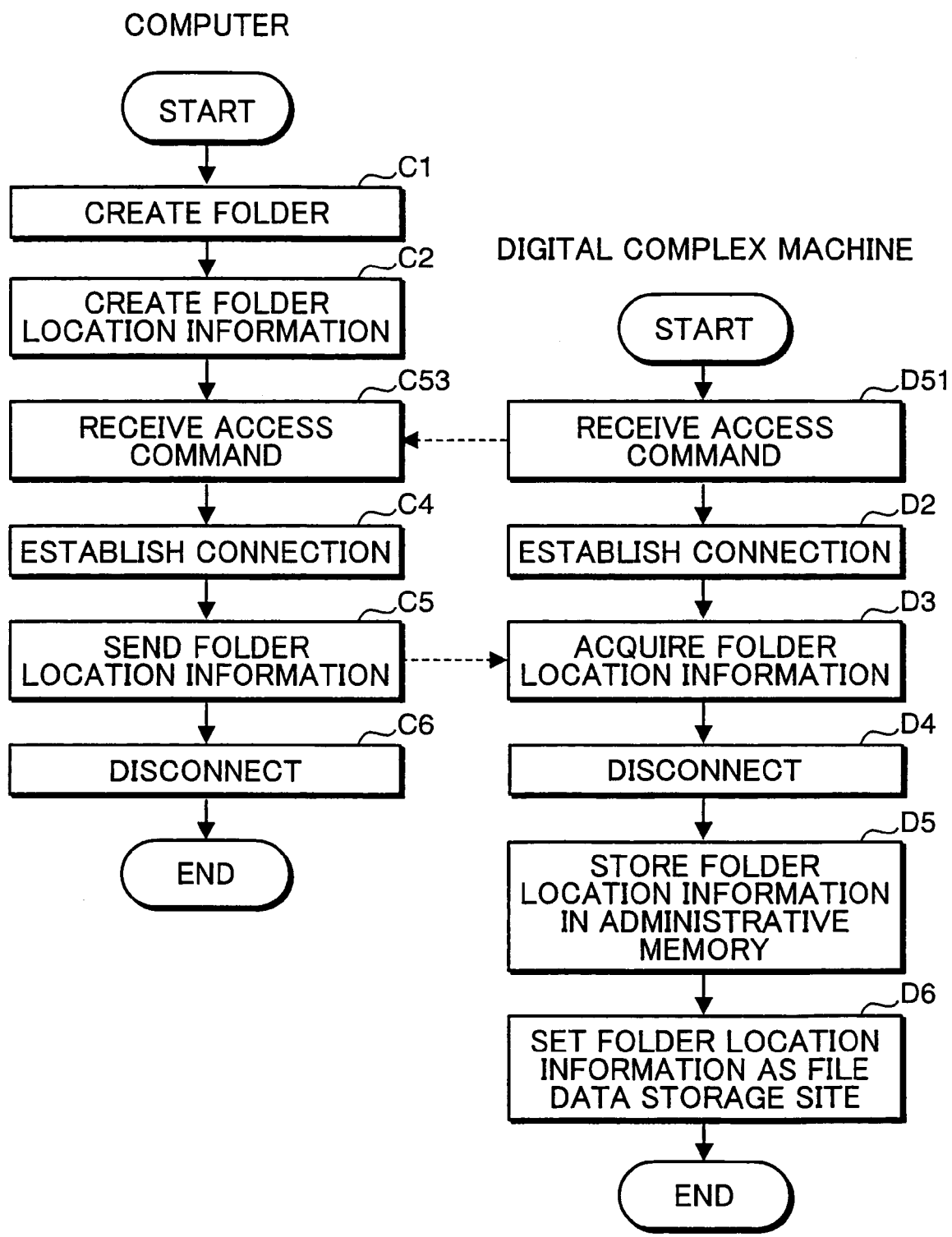
FIG. 6 is a flowchart showing a modified processing of setting a document data storage site in the image forming apparatus.

In the exemplified processing shown in FIG. 4, the digital complex machine 1 sends a command requesting transmission of folder location information to the operative computer, and thereafter communicative connection between the digital complex machine 1 and the operative computer is established. Instead, the operative computer may send an access command to the digital complex machine 1, which, thereafter, acquires folder location information from the operative computer in response to the issuance of the access command from the operative computer. FIG. 6 is a flowchart showing another exemplified sequence of operations between the digital complex machine 1 and the operative computer in the second embodiment. Steps in the processing in FIG. 6 which are identical to those in FIG. 4 are denoted at the same reference numerals, and description thereof will be omitted herein.

First, a folder and information relating to the location of the folder are created in the operative computer (Steps C1 and C2). Then, the CPU 300 sends to the digital complex machine 1 an access command requesting setting of the folder location information in the digital complex machine 1 via the network (Step C53).

Upon receiving the access command, the digital complex machine 1 sends back a reply of access approval to the operative computer, so that the folder location information is set in the digital complex machine 1. Upon receiving the access approval reply from the digital complex machine 1, communicative connection with the digital complex machine 1 is established by the CPU 300 (Step C4). Upon establishment of the connection with the digital complex machine 1, the CPU 300 sends the folder location information to the digital complex machine 1 with use of the network I/F 307 (Step C5). After the transmission of the folder location information, the operative computer is disconnected from the digital complex machine 1 by the CPU 300 (Step C6).

On the other hand, referring to the processing in the digital complex machine 1, when the file data acquiring section 111 receives an access command from the operative computer (Step D51), the digital complex machine 1 sends back a reply of access approval to the operative computer, and communicative connection with the operative computer is established (Step D2). After the location information receiving section 108B acquires folder location information from the operative computer (Step D3), the digital complex machine 1 is disconnected from the operative computer (Step D4).

Figure 7:
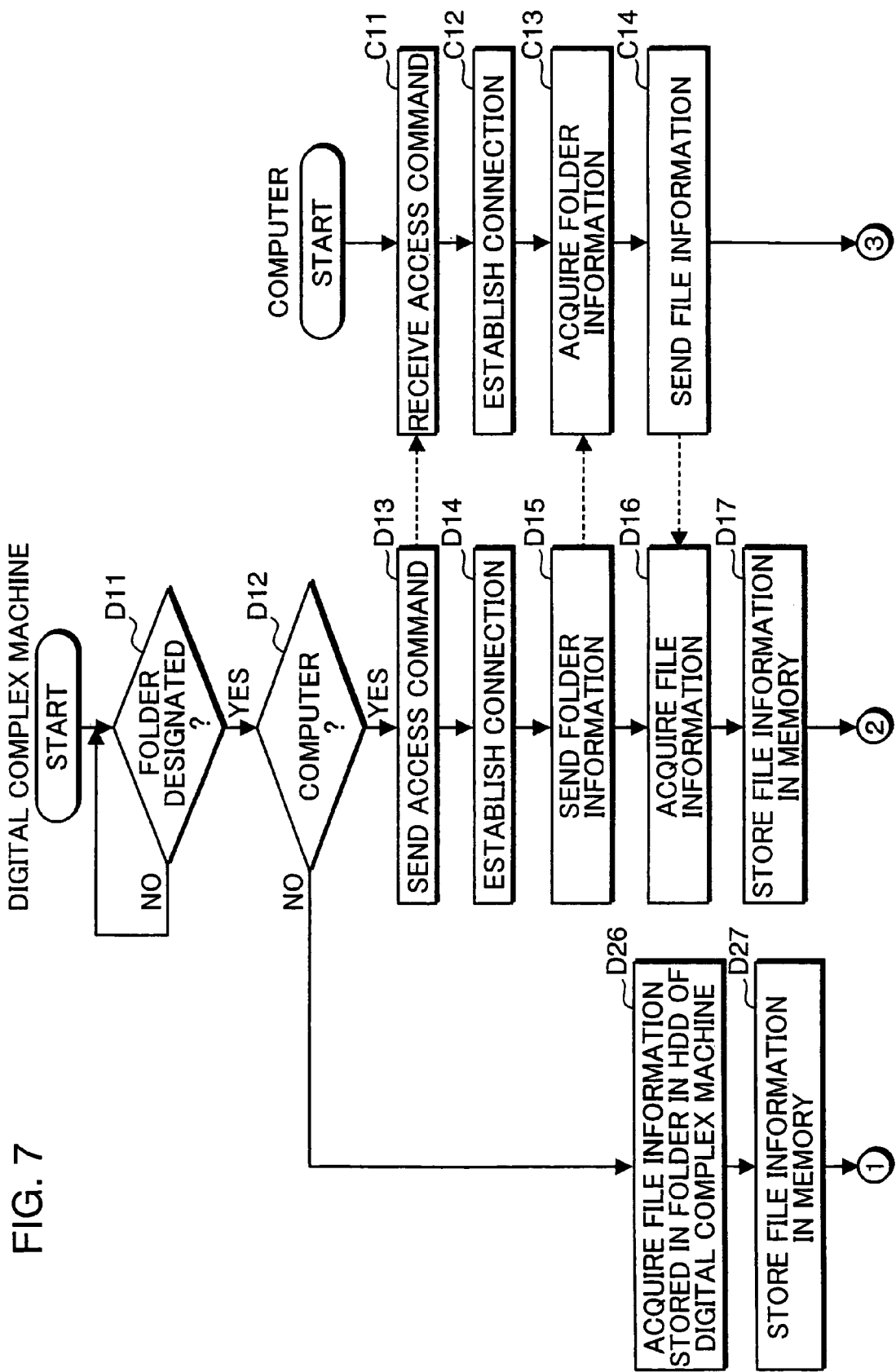
FIGS. 7 and 8 are a set of flowcharts showing a processing of reading out document data from a storage section in the image forming apparatus or from a storage section in the computer communicatively connected with the image forming apparatus via the network.
Figure 8:
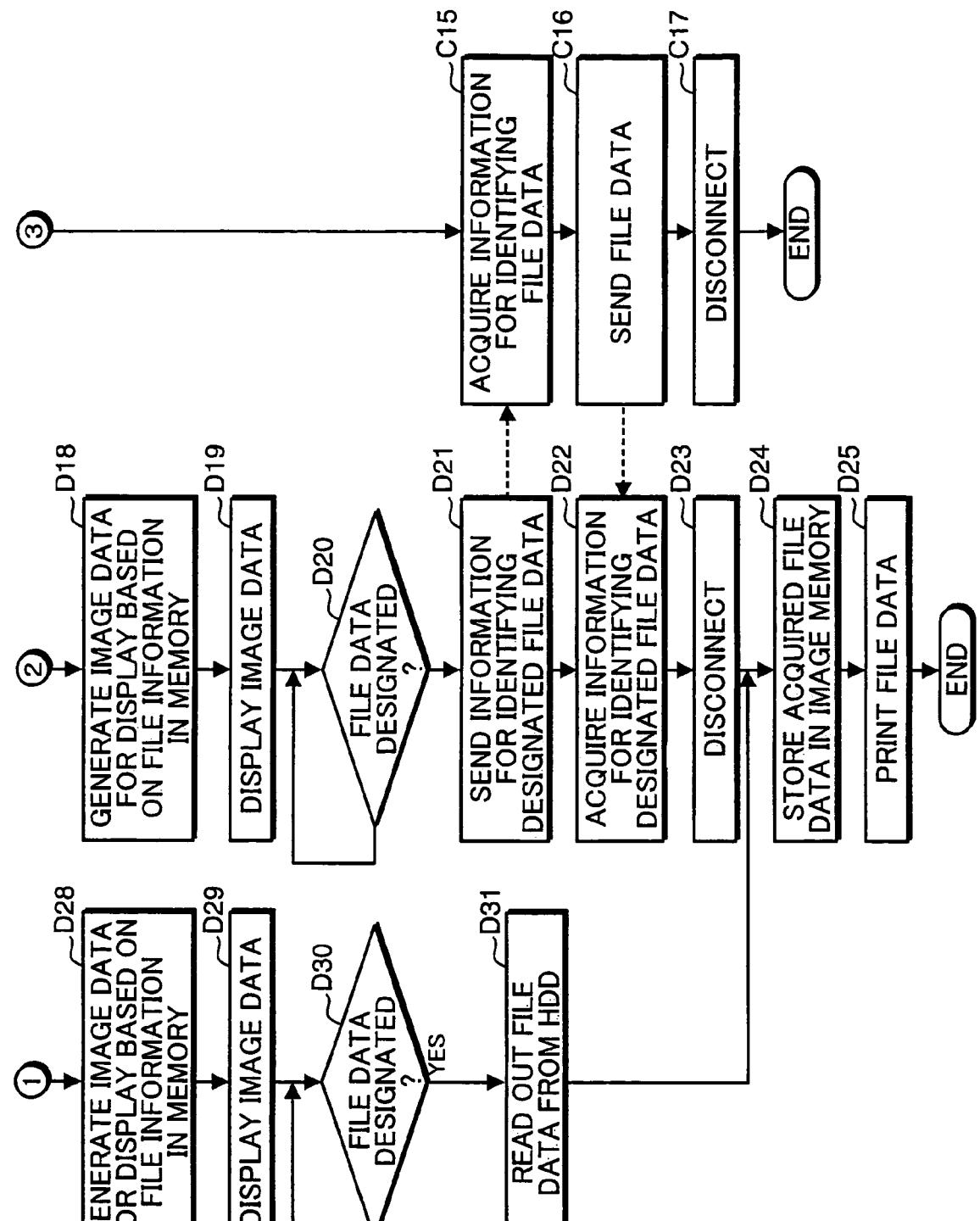
Figure 9:
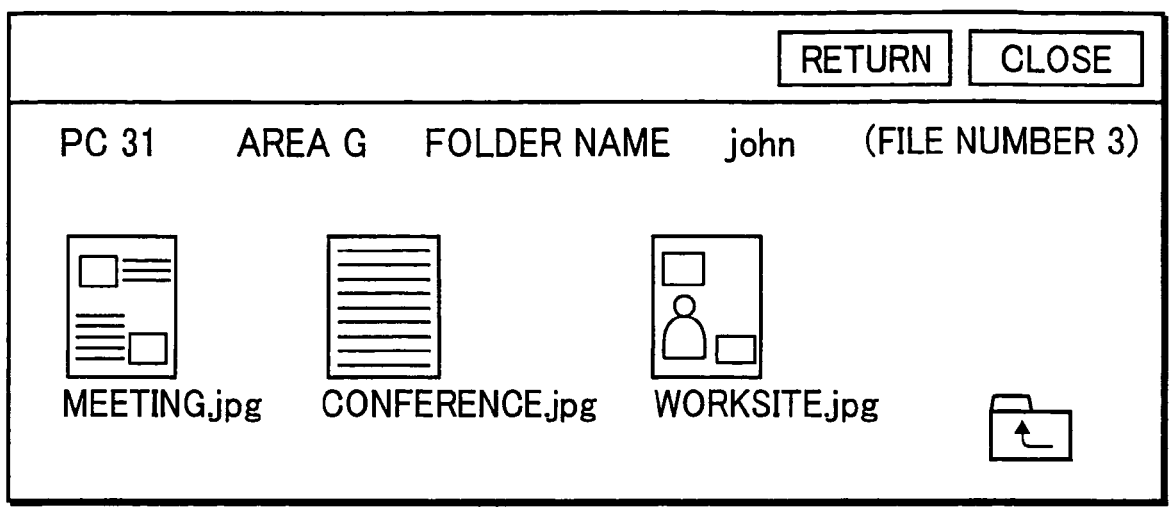
FIG. 9 is an illustration of an exemplified display screen showing a list of document data in a folder.

Next, described is a processing as to how stored document data is read out from the HDD 305 of the digital complex machine 1 or from the storage section of the operative computer. FIGS. 7 and 8 are a set of flowcharts explaining the processing. FIG. 9 is an illustration of an exemplified display screen showing a list of files displayed on the display unit 191.

When a folder as a document data storage site is designated by a user on the operation panel section 190 of the digital complex machine 1 in storing document data or reading out the stored document data (YES in Step D11), the main controller 100 judges whether the designated folder exists in the digital complex machine 1 or in the operative computer (Step D12).

If it is judged that the designated folder exists in the digital complex machine 1 (NO in Step D12), the main controller 100 acquires, from the designated folder in the HDD 305 of the digital complex machine 1, file information such as the name and volume of each file in the designated folder, as well as data for displaying a thumbnail image (Step D26), and temporarily stores the acquired file information in the administrative memory 200 (Step D27). It should be appreciated that the acquired file information may be stored in a memory other than the administrative memory 200, as far as such a memory can temporarily store data.

Subsequently, the main controller 100 generates image data for display such as a thumbnail image and the name of each file in the designated folder based on the file information stored in the administrative memory 200 (Step D28), and temporarily stores the generated image data in the image memory 140. The file display controlling section 112 controls the display unit 191 to display the image data stored in the image memory 140 in terms of a screen image as shown in FIG. 9, for instance (Step D29). When the user designates a file, the contents of which are to be printed out, by manipulation on the operation panel section 190 (YES in Step D30), the main controller 100 is operated to read out the document data of the designated file from the folder in the HDD 305 of the digital complex machine 1 (Step D31), and store the document data in the image memory 140 (Step D24). Then, the main controller 100 is operated to execute printout of the document data by sending the document data stored in the image memory 140 to the imaging unit 132 (Step D25).

In the case where the designated folder exists in the operative computer (YES in Step D12), the digital complex machine 1 sends an access command requesting transmission of the folder location information to the operative computer in which the designated folder is registered (Step D13). The access command is sent to the operative computer with use of the network controller 105 of the digital complex machine 1 via the network I/F 210.

Upon receiving the access command, the operative computer sends back an access approval reply to the digital complex machine 1, so that the digital complex machine 1 can acquire the folder location information. Upon receiving the access approval reply, the network controller 105 of the digital complex machine 1 establishes communicative connection with the operative computer (Step D14).

When the connection with the operative computer is established, the transmission directing section 113 of the digital complex machine 1 sends, to the operative computer, information necessary for identifying the designated folder (including information for identifying the folder on the intranet, such as IP address and URL) (Step D15), and the file information acquiring section 110 acquires, from the operative computer, file information such as file-related information attached to the file stored in the designated folder (if possible, including data for displaying a thumbnail image) (Step D16). The acquired file information is temporarily stored in the image memory 140 under the control of the main controller 100 (Step D17).

The file display controlling section 112, then, is operated to generate image data for display such as the name of each file based on the file information stored in the image memory 140 (Step D18), and controls the display unit 191 to display the image data (Step D19).

When a file is designated as one whose contents is to be printed out by the user's manipulation on the operation panel section 190 (YES in Step D20), the transmission directing section 113 sends, to the operative computer, information necessary for identifying the designated file (Step D21), and the file data acquiring section 111 acquires, from the operative computer, the document data of the designated file (not file-related information attached to the file, but substantial data constituting the contents of the file; referred to as file data) (Step D22). After acquiring the file data, the network controller 105 disconnects the communication from the operative computer (Step D23). Then, the acquired file data is stored in the image memory 140 under the control of the main controller 100 (Step D24), and the main controller 100 is operated to execute printout of the file data by sending the file data in the image memory 140 to the imaging unit 132 (Step D25).

Referring to the processing in the operative computer, upon receiving an access command from the digital complex machine 1 (Step C11), the CPU 300 sends back an access approval reply to the digital complex machine 1 to establish communicative connection with the digital complex machine 1 (Step C12). Upon receiving information for identifying the designated folder from the digital complex machine (Step C13), the CPU 300 sends file-related information concerning each document data in the designated folder to the digital complex machine 1 (Step C14).

Then, upon receiving information for identifying the designated document data from the digital complex machine 1 (Step C15), the CPU 300 sends the designated document data to the digital complex machine 1 (Step C16). After the transmission of the document data, the communication with the digital complex machine 1 is disconnected by the CPU 300 (Step C17).

In this way, the storage status of files in the designated folder in the operative computer is displayed on the display unit 191 of the operation panel section 190 of the inventive digital complex machine 1. With such an arrangement, the user can grasp the storage status of the files in the folder in the operative computer merely by viewing the display unit 191 of the digital complex machine 1.

Further, the user is allowed to print out document data contained by a file by reading out the file stored in the operative computer by manipulation on the operation panel section 190 of the digital complex machine 1. With such an arrangement, the file data in the operative computer is printable by the digital complex machine 1 (so-called "pull printing" is executable) without sending a printout command from the operative computer to the digital complex machine 1. Thus, the inventive digital complex machine 1 provides improved usability.

The present invention is not limited to the foregoing embodiments, and various modifications and alterations are applicable. For instance, in the foregoing embodiments, a folder in the server computer and the personal computers 31 through 34 communicatively connected with the digital complex machine 1 via the intranet is designated, file information and document data are acquired from the designated folder, necessary information are displayed on the display unit 191 of the operation panel section 190, and file data is printed out by the data recording section 130. Alternatively, the digital complex machine 1 may be so configured that document data registration, retrieval, and display are executable with respect to a computer for administering documents with use of a so-called Web document administration software by activating a browsing function (Web browser) of a document administration operating system.

In such an alteration, a versatile operating system used for a personal computer (e.g. Windows®) may be used as a document administration operating system for the digital complex machine 1. With such an alteration, a user is allowed to directly browse, on the side of the digital complex machine 1, the contents of folders administered by such an operating system (e.g. Windows®) in the operative computers such as the server computer SV2 and the personal computers 31 through 34. Thus, provided is an arrangement in which a user is allowed to browse, from the digital complex machine 1, the contents in the storage sections of the operative computers easily and at a reduced cost.

In such an arrangement, folders and file information stored in the storage sections of the operative computers are acquired and displayed on the display unit 191 by applying the browsing function of the document administration operating system to the digital complex machine 1. After the displaying, designated file data is acquired from the operative computer to be printed out. The file information acquiring section 110, the file display controlling section 112, and the file data acquiring section 111 constitute a Web browser.

Alternatively, it may be possible to display a desired web site on the display unit 191 by designating a URL on the Internet displayed on the display unit 191 of the operation panel section 190 with use of the browsing function. With such an arrangement, an image other than the data obtained by reading a printable image with the digital complex machine 1 and the file data stored in the storage sections of the operative computers can be outputted (printed out) by the digital complex machine 1.

In the foregoing embodiments, the respective elements of the digital complex machine 1 such as the data recording section 130 and the scanning section 120 are directly connected with the main controller 100. Alternatively, the respective elements of the digital complex machine 1 may be indirectly connected with the main controller 100 via a bus as far as data are directly communicable between the respective elements.

The foregoing embodiments are merely an example of the present invention. The arrangement of the digital complex machine 1 and the processing to be executed by the digital complex machine 1 may be optically altered.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. an image forming apparatus adapted to be connected via a network with at least one computer having a storage section capable of creating at least one folder, the apparatus comprising:

a data acquiring section to acquire document data by reading a document image;

a location information acquiring section to acquire location information from each of the at least one computer through the network, the location information relating to a location of the at least one folder created in the storage section of each of the at least one computer;

an administering section to register the at least one folder of the at least one computer identified by the location information acquired by the location information acquiring section to an administrative memory as at least one folder capable of storing the document data;

a display unit to display an image;

a folder display controlling section to control the display unit to display an image of one or more folders of the at least one computer registered in the administrative memory;

an input operation unit to accept an input operation by a user;

a folder designation accepting section to allow the user to designate a desired folder among the one or more folders of the at least one computer displayed on the display unit for acceptance with use of the input operation unit; and a data transmitting section to transmit the document data to the designated folder of the at least one computer in accordance with the user's designation at the input operation unit.

2. The image forming apparatus according to claim 1, wherein the location information acquiring section comprises:

a location information transmission directing section to send a request to each of said at least one computer for transmission of the location information; and a location information receiving section to receive the location information transmitted from each of the at least one computer in response to the request.

3. The image forming apparatus according to claim 1, wherein the location information acquiring section comprises a location information receiving section to receive the location information transmitted from one of the at least one computer that has requested the image forming apparatus to register the location information.

4. The image forming apparatus according to claim 1, wherein the location information acquiring section acquires the location information in a CSV format or an attribute file format.

5. The image forming apparatus according to claim 1, wherein the folder designation accepting section allows the user to designate a desired folder among the at least one folder created in each of the at least one computer for acceptance with use of the input operation unit; and the image forming apparatus further comprises:

a file information acquiring section to acquire information related to at least one file each containing document data and stored in the desired folder accepted by the folder designation accepting section; and a file display controlling section to control the display unit to display an image of the at least one file stored in the designated folder on a basis of the acquired information.

6. The image forming apparatus according to claim 5, further comprising:

a file designation accepting section to allow the user to designate a desired file among the at least one file displayed on the display unit for acceptance with use of the input operation unit;

a file data acquiring section to acquire document data contained by the designated file from one of the at least computer having a folder storing the designated file; and a data recording section to print out the acquired document data.

7. The image forming apparatus according to claim 6, wherein the file information acquiring section, the file display controlling section and the file data acquiring section constitute a computer operative on a basis of a Web browser.

8. The image forming apparatus according to claim 7, wherein the image forming apparatus is adapted to be connected with an Internet, and the computer unit, on the basis of the Web browser, acquires document data from a website on the Internet, controls the display unit to display the same and controls the data recording section to print out the same.

9. A document administration system comprising:

at least one computer having a storage section capable of creating at least one folder; and an image forming apparatus connected with the at least one computer via a network, the apparatus comprising:

a data acquiring section to acquire document data by reading a document image;

a location information acquiring section to acquire location information from each of the at least one computer through the network, the location information relating to a location of the at least one folder created in the storage section of each of the at least one computer;

an administering section to register the at least one folder of the at least one computer identified by the location information acquired by the location information acquiring section to an administrative memory as at least one folder capable of storing the document data;

a display unit to display an image;

a folder display controlling section to control the display unit to display an image of one or more folders of the at least one computer registered in the administrative memory;

an input operation unit to accept an input operation by a user;

a folder designation accepting section to allow the user to designate a desired folder among the one or more folders of the at least one computer displayed on the display unit for acceptance with use of the input operation unit; and a data transmitting section to transmit the document data to the designated folder of the at least one computer in accordance with the user's designation at the input operation unit.

10. The document administration system according to claim 9, wherein the at least one computer stores the document data transmitted by the data transmitting section in the storage section.

* * * * *